US010202013B2

(12) United States Patent
Steiner et al.

(10) Patent No.: US 10,202,013 B2
(45) Date of Patent: Feb. 12, 2019

(54) EXTRUDED SUSPENSION LINKAGE

(71) Applicant: Dura Operating, LLC, Auburn Hills, MI (US)

(72) Inventors: Walter Joseph Steiner, Rochester, MI (US); Robert Hendren, Macomb, MI (US); Jim Norman, St. Clair Shores, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/057,699

(22) Filed: Mar. 1, 2016

(65) Prior Publication Data
US 2017/0253097 A1  Sep. 7, 2017

(51) Int. Cl.
*B60G 7/00* (2006.01)
*B60G 3/20* (2006.01)
*B21C 23/08* (2006.01)
*B21C 35/02* (2006.01)

(52) U.S. Cl.
CPC ............ *B60G 7/001* (2013.01); *B21C 23/085* (2013.01); *B21C 35/023* (2013.01); *B21C 35/026* (2013.01); *B60G 3/20* (2013.01); *B60G 2200/10* (2013.01); *B60G 2200/184* (2013.01); *B60G 2206/014* (2013.01); *B60G 2206/10* (2013.01); *B60G 2206/11* (2013.01); *B60G 2206/71* (2013.01); *B60G 2206/7102* (2013.01); *B60G 2206/7103* (2013.01); *B60G 2206/8105* (2013.01)

(58) Field of Classification Search
CPC ............ B60G 7/001; B60G 2206/7103; B60G 2206/7102; B60G 2200/10; B60G 2206/10; B60G 2206/8105
See application file for complete search history.

(56) References Cited

U.S. PATENT DOCUMENTS

| 1,380,659 | A | * | 6/1921 | Layman | F16C 7/02 |
| | | | | | 74/559 |
| 5,007,497 | A | * | 4/1991 | Trema | B62K 25/005 |
| | | | | | 180/219 |
| 5,362,090 | A | * | 11/1994 | Takeuchi | B60G 3/06 |
| | | | | | 280/124.146 |
| 5,607,177 | A | * | 3/1997 | Kato | B60G 3/06 |
| | | | | | 188/377 |
| 5,800,024 | A | * | 9/1998 | Steimmel | B21D 53/88 |
| | | | | | 180/905 |
| 6,070,445 | A | | 6/2000 | Holierhoek | |
| 6,810,586 | B1 | * | 11/2004 | Waaler | B60G 7/001 |
| | | | | | 280/124.134 |

(Continued)

FOREIGN PATENT DOCUMENTS

CN 1812894 A 8/2006
DE 102010018903 A1 12/2010
(Continued)

*Primary Examiner* — Paul N Dickson
*Assistant Examiner* — Timothy Wilhelm
(74) *Attorney, Agent, or Firm* — Robert E. Ford; Raymond J. Vivacqua; Steven L. Crane

(57) ABSTRACT

A suspension linkage for a motor vehicle includes an extruded body having a first wall and a longitudinal length. An extruded feature is disposed on the first wall of the extruded body and extends along the longitudinal length. The extruded feature has a cross-sectional profile configured to control a flexural rigidity of the suspension linkage.

16 Claims, 3 Drawing Sheets

(56) References Cited

U.S. PATENT DOCUMENTS

| | | | |
|---|---|---|---|
| 7,163,219 B2 | 1/2007 | Seksaria et al. | |
| 7,261,307 B2* | 8/2007 | Nuno | B60G 3/20 |
| | | | 280/124.1 |
| 7,273,219 B2* | 9/2007 | Michel | B60G 7/001 |
| | | | 280/124.134 |
| 7,850,182 B2 | 12/2010 | Jang et al. | |
| 7,918,200 B2* | 4/2011 | Nguyen | F01L 1/182 |
| | | | 123/90.16 |
| 7,980,576 B2* | 7/2011 | Inoue | B60G 7/001 |
| | | | 280/124.121 |
| 8,616,570 B2 | 12/2013 | Mielke et al. | |
| 8,690,176 B2* | 4/2014 | Perry | B21D 53/88 |
| | | | 280/124.134 |
| 8,783,993 B2* | 7/2014 | Brunneke | B60G 7/001 |
| | | | 280/93.51 |
| 2001/0040387 A1 | 11/2001 | Takagi et al. | |
| 2009/0072506 A1 | 3/2009 | Jang et al. | |
| 2010/0084834 A1* | 4/2010 | Ersoy | B60G 7/001 |
| | | | 280/124.1 |
| 2012/0299264 A1 | 11/2012 | Pedersen et al. | |
| 2012/0315414 A1* | 12/2012 | Wesch | B60G 7/001 |
| | | | 428/34.1 |
| 2014/0210177 A1* | 7/2014 | Dicke | B60G 7/001 |
| | | | 280/124.134 |
| 2016/0075201 A1* | 3/2016 | Mosteiro Goyoaga | |
| | | | B60G 7/001 |
| | | | 280/124.1 |

FOREIGN PATENT DOCUMENTS

| | | |
|---|---|---|
| JP | 2001097014 A | 4/2001 |
| JP | 2010254255 A | 11/2010 |

\* cited by examiner

EXTRUDED SUSPENSION LINKAGE

FIELD

The invention relates generally to an extruded suspension linkage for a motor vehicle, and more particularly to an extruded suspension linkage for a motor vehicle having a reinforcement feature that has a cross-sectional profile configured to control a flexural rigidity of the extruded suspension linkage.

BACKGROUND

The statements in this section merely provide background information related to the present disclosure and may or may not constitute prior art.

A typical motor vehicle has numerous metal linkages that connect one member to another. For example, a specific category of metal linkages include suspension linkages used in the suspension system of motor vehicles. Suspension linkages generally connect components of the motor vehicle drive unit, such as wheels or axles, to the body or frame of the motor vehicle in order to transmit static and dynamic loads there between. For example, suspension linkages may include upper and lower control arms, tension linkages, longitudinal linkages, transverse linkages, forward or rear spring arms, etc. The suspension linkages are typically connected to the members of the motor vehicle via bearings to allow relative movement of the components of the suspension system and the frame of the motor vehicle.

In the past, these suspension linkages were made from stamped steel parts, assembled, and pressed into their final shapes. To reduce weight, these suspension linkages have more recently been made from forged/cast aluminum pieces which are welded together to form the final part or from extruded aluminum or other extruded metals or alloys. Extruded suspension linkages have the advantage of not requiring welds and generally reduce the post-processing requirements of the suspension linkage. While these extruded suspension linkages are useful for their intended purpose, it is difficult to control the flexural rigidity and strength of the suspension linkage while simultaneously minimizing weight and meeting packaging and tolerance requirements. Accordingly, there is a need in the art for an extruded suspension linkage that meets these requirements.

SUMMARY

A suspension linkage for a motor vehicle is provided. The suspension linkage includes an extruded body having a first wall and a longitudinal length. An extruded feature is disposed on the first wall of the extruded body and extends along the longitudinal length. The extruded feature has a cross-sectional profile configured to control a flexural rigidity of the suspension linkage.

In one aspect, the extruded feature is a rib.

In another aspect, the rib is disposed on an inner surface of the first wall of the extruded body and the rib extends out from the inner surface of the first wall.

In yet another aspect, the rib extends along the entire longitudinal length of the first wall.

In yet another aspect, the first wall has a wall width and the rib has a rib width and the rib width is less than the wall width.

In yet another aspect, the rib width is less than half the wall width.

In yet another aspect, the rib is located on an outer surface of the first wall of the extruded body and the rib extends out from the outer surface.

In yet another aspect, the extruded body further includes a second wall and a third wall that connects the first wall to the second wall, and wherein an outer surface of the first wall is convex.

In yet another aspect, the extruded feature is a groove formed in the first wall of the extruded body.

In yet another aspect, the groove is formed in an inner surface of the first wall of the extruded body and the groove extends into the inner surface, and wherein the groove has a width less than a width of the first wall.

In yet another aspect, the groove is formed in an outer surface of the first wall of the extruded body and the groove extends into the outer surface, and wherein the groove has a width less than a width of the first wall.

In yet another aspect, the extruded body includes a first end portion disposed longitudinally opposite a second end portion, wherein the first end portion is connectable to a suspension unit and the second end portion is connectable to a frame of the motor vehicle.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
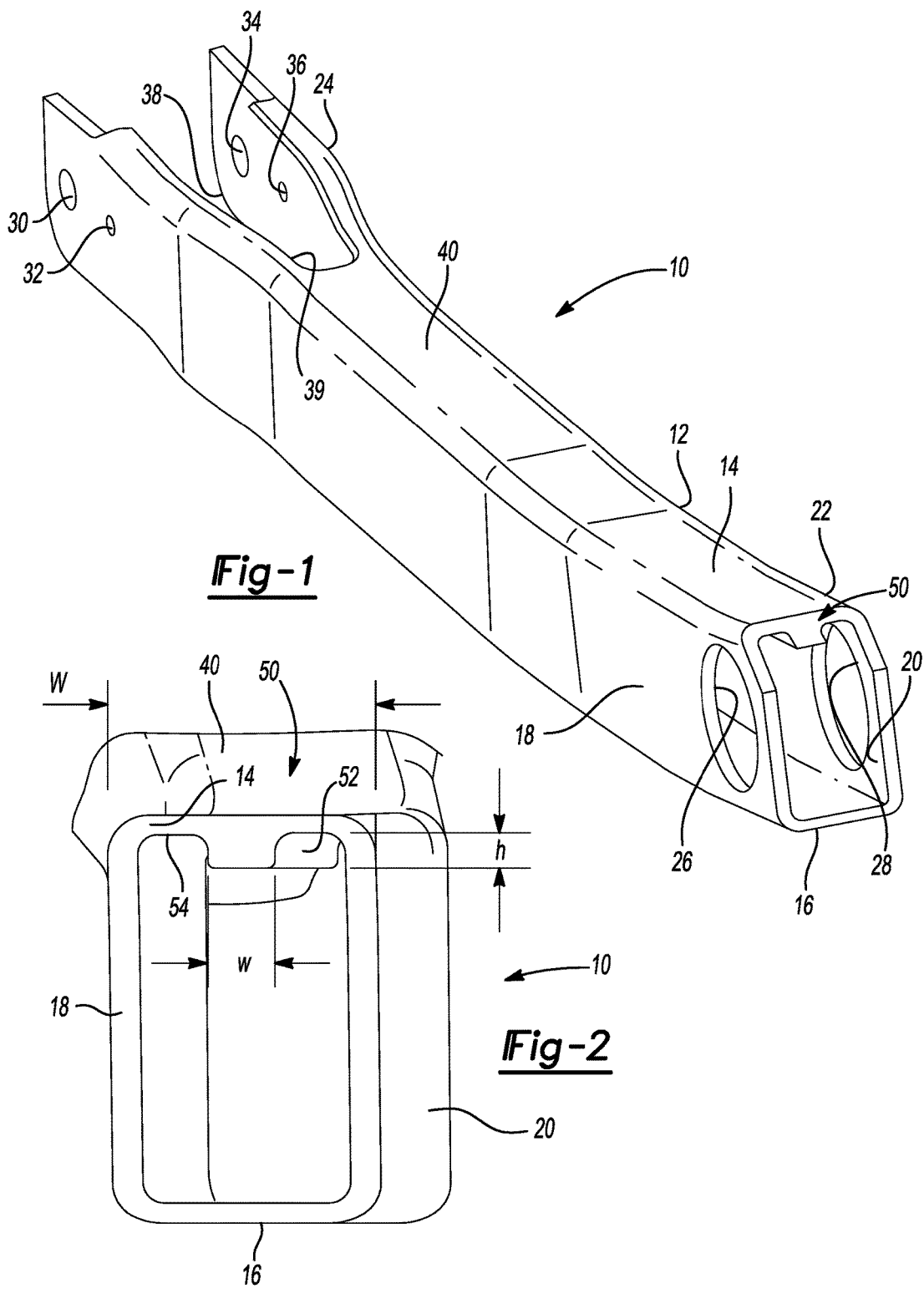
FIG. 1 is a front perspective view of an extruded suspension linkage according to the principles of the present invention.
FIG. 2 is a front view of the extruded suspension linkage.

With reference to FIGS. 1 and 2, an extruded suspension linkage is generally indicated by reference number 10. The extruded suspension linkage 10 may be configured as an upper or lower control arm, a tension linkage, a longitudinal linkage, a transverse linkage, a forward or rear spring arm, etc. The extruded suspension linkage 10 generally includes a body 12. The body 12 is formed from an extruded metal or alloy and then subjected to post-processing to produce particular features which will be described below. In one example, the body 12 is generally formed from extruded aluminum. In another example, the body 12 is formed from extruded magnesium. In addition, it should be appreciated that the body 12 may be made from various other suitable extrudable metals or alloys.

In the example provided, the body 12 is formed as an elongated, rectangular tube having a top wall 14, a bottom wall 16, a first side wall 18, and a second side wall 20. However, the body 12 may have other profile configurations so long as the body 12 includes at least one wall. For example, the body 12 may have a hat shaped profile, an open "C"-shaped profile with a gap between walls, a cylindrical profile, etc. The body 12 further includes a first end portion 22 and a second end portion 24 disposed longitudinally opposite the first end portion 22.

The first end portion 22 is configured to be attached to a component of a suspension unit (not shown) and includes first and second holes 26, 28 formed in the first and second side walls 18, 20, respectively. The first and second holes 26, 28 may be cut or punched into the body 12 during post-processing. The second end portion 24 is configured to be attached to a body frame (not shown) of a motor vehicle and includes mounting holes 30 and 32 formed in the first side wall 20, mounting holes 34 and 36 formed in the second side wall 22, and "v" shaped slots 38, 39 formed in the top and bottom walls 14, 16, respectively. It should be appreciated that the body 12 may include additional features to accommodate particular installation configurations.

The body 12 may be bent or curved in post-processing so that one or more of the walls 14, 16, 18, 20 may be concave and an opposite wall is convex. In the example provided, the body 12 is bent such that an outer surface 40 of the body 12 is concave along the top wall 14 while the outer surface 40 is convex along the bottom wall 16.

The extruded suspension linkage 10 further includes an extruded reinforcement feature 50 formed on the body 12. The extruded reinforcement feature 50 has a cross-sectional profile configured to control a flexural rigidity of the extruded suspension linkage 10. Generally, the extruded reinforcement feature 50 is comprised of a rib 52 that increases the thickness of one of the walls 14, 16, 18, and 20. The rib 52 is formed on the extruded suspension linkage 10 during the extrusion process. In the example provided, the rib 52 is disposed on an inner surface 54 of the first wall 14. Preferably, the rib 52 is disposed on whichever of the walls 14, 16, 18, and 20 is convex in order to maximize the strength or flexural rigidity of the extruded suspension linkage 10. In addition, locating the rib 52 on the inner surface 54 minimizes the impact on packaging of the extruded suspension linkage 10. The rib 52 has a substantially rectangular cross-section and has a height "h" and a width "w". However, the rib 52 may have other cross-sectional profiles without departing from the scope of the present invention. The width w of the rib 52 is less than a width "W" of the top wall 14, as shown in FIG. 2. In a preferred embodiment, the width w of the rib 52 is less than half the width W of the top wall 14. The rib 52 extends longitudinally along the length of the first wall 14 from the first end portion 22 to the second end portion 24. In addition, the rib 52 is preferably centered on the first wall 14 to balance forces.

Figure 3:
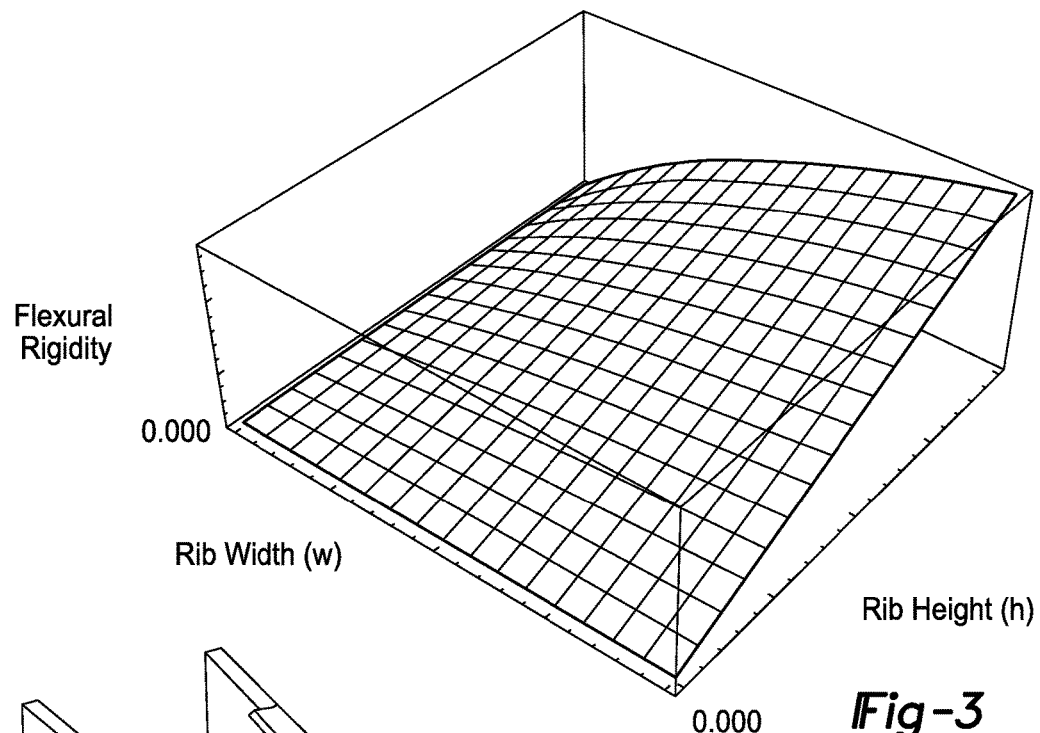
FIG. 3 is a graph illustrating an example relationship of a flexural rigidity of the extruded suspension linkage to a rib height and a rib width.

Turning to FIG. 3, a graph illustrates the relationship between the width w of the rib 52, the height h of the rib 52, and the flexural rigidity of the extruded suspension linkage 10. Generally, increasing the rib width w and the rib height h increases the flexural rigidity of the extruded suspension linkage 10. Thus, the flexural rigidity of the extruded suspension linkage 10 can be adjusted by simply changing the dimensions of the rib 52. Fine tuning the flexural rigidity of the extruded suspension linkage 10 by changing the dimensions of the rib 52 allows for quick adjustments to accommodate different load requirements for a given application.

Figure 4:
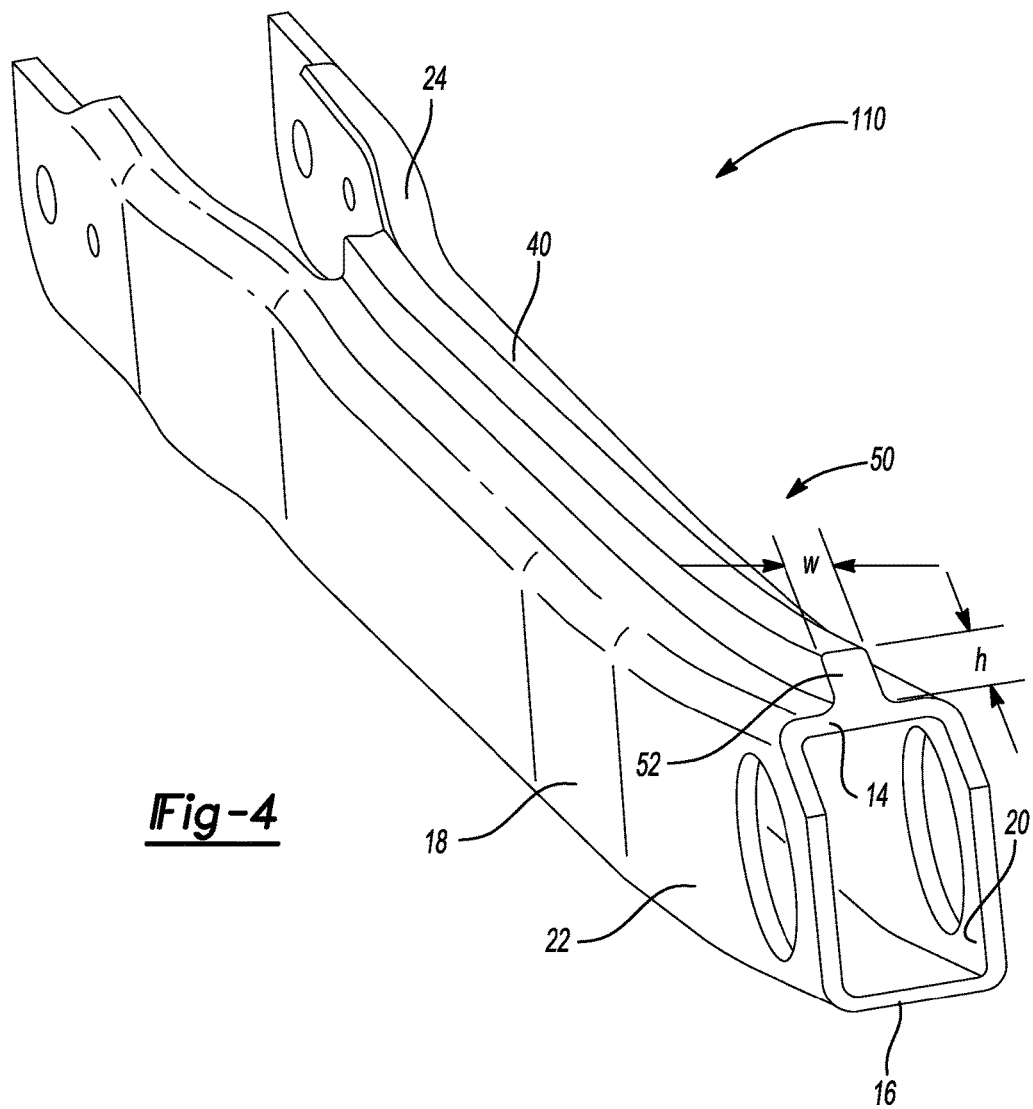
FIG. 4 is a front perspective view of another example of an extruded suspension linkage according to the principles of the present invention.

Turning now to FIG. 4, an alternate extruded suspension linkage is generally indicated by reference number 110. The extruded suspension linkage 110 is similar to the extruded suspension linkage 10 shown in FIGS. 1-2 and therefore like components are indicated by like reference numbers. However, in the extruded suspension linkage 110, the rib 52 is formed on the outer surface 40 of the first wall 14.

Figure 5:
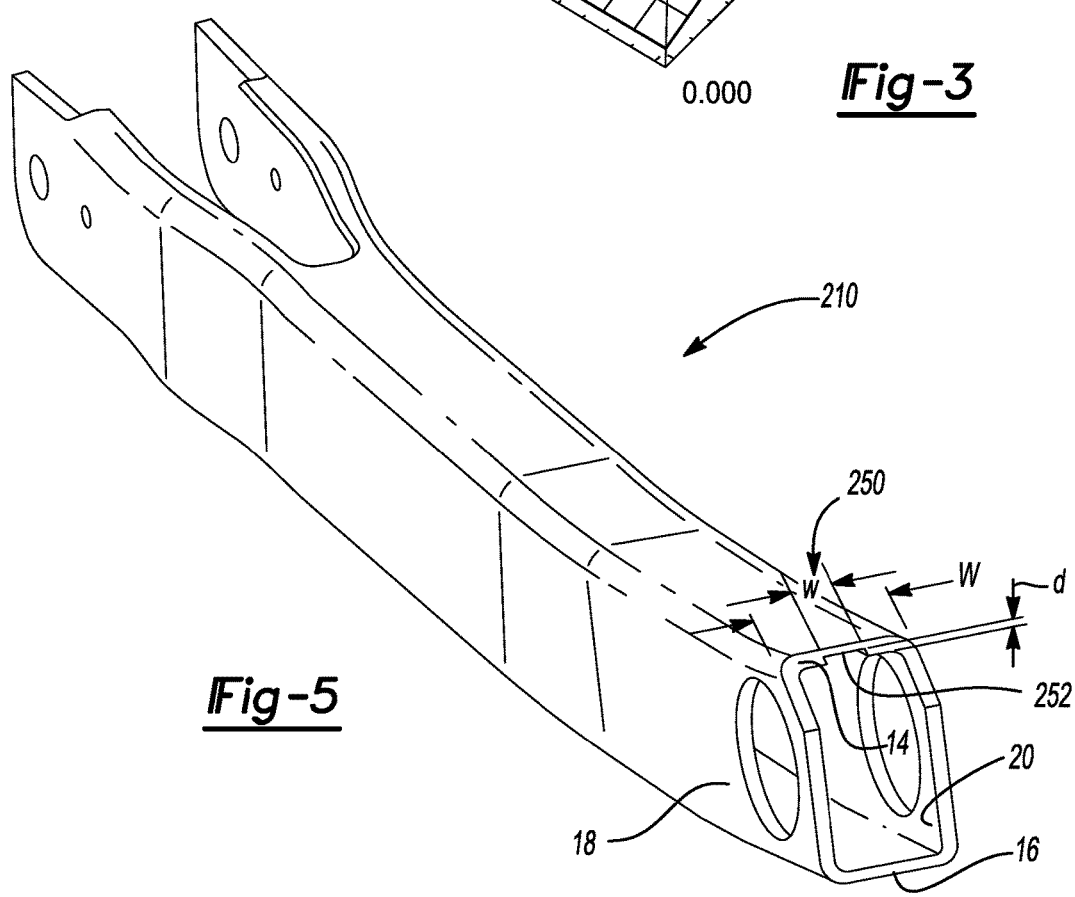
FIG. 5 is a front perspective view of another example of an extruded suspension linkage according to the principles of the present invention.

Turning to FIG. 5, yet another alternate extruded suspension linkage is generally indicated by reference number 210. The extruded suspension linkage 210 is similar to the extruded suspension linkage 10 shown in FIGS. 1-2 and therefore like components are indicated by like reference numbers. However, the extruded suspension linkage 210 includes an extruded feature 250. The extruded feature 250 has a cross-sectional profile configured to reduce a flexural rigidity of the extruded suspension linkage 210. Generally, the extruded feature 250 is comprised of a groove 252 that decreases the thickness of one of the walls 14, 16, 18, and 20. The groove 252 is formed on the extruded suspension linkage 10 during the extrusion process. In the example provided, the groove 252 is disposed on an inner surface 54 of the first wall 14. However, the groove 252 may be disposed on the outer surface 40 and on any of the walls 16, 18, 20. The groove 252 may have various cross-sectional profiles without departing from the scope of the present invention. The groove 252 has a width "w" and a depth "d". The width w of the groove 252 is less than a width "W" of the wall. In a preferred embodiment, the width w of the groove 252 is less than half the width W of the wall. The groove 252 extends longitudinally along the length of the first wall 14 from the first end portion 22 to the second end portion 24. The groove 252 functions in a manner similar to that of the rib 52 but can be considered to reduce the flexural rigidity of the extruded suspension linkage 10 by removing material rather than adding material.

The description of the invention is merely exemplary in nature and variations that do not depart from the gist of the invention are intended to be within the scope of the invention. Such variations are not to be regarded as a departure from the spirit and scope of the invention.

The following is claimed:

1. A suspension linkage for a motor vehicle comprising:
an extruded body having a longitudinal length and having a fixed cross-sectional profile along a portion of the longitudinal length that is created by pushing a material through a die that defines the fixed cross-section, the extruded body having an enclosed hollow cross-section, the extruded body having a first wall having a first thickness, the first wall forming a portion of the enclosed hollow cross-section along at least a portion of the longitudinal length; and
an extruded rib projecting from a surface of the first wall of the extruded body and extending along the entire longitudinal length of the first wall, the rib having a proximal end connected to the first wall and an opposite unconnected distal end spaced away from the first wall, wherein the extruded rib has a thickness greater than the first thickness and has a cross-sectional profile configured to control a flexural rigidity of the suspension linkage;
wherein the rib is located on an outer surface of the first wall of the extruded body and the rib projects from the outer surface;
wherein the first wall has a first edge and a second edge defining a width of the first wall;
wherein the rib has a first side and a second side defining a width of the rib and wherein the first and second sides are spaced inward from the first and second edges.

2. The suspension linkage of claim 1 wherein the first wall has a wall width and the rib has a rib width and the rib width is less than the wall width.

3. The suspension linkage of claim 2 wherein the rib width is less than half the wall width.

4. The suspension linkage of claim 1 wherein the extruded body further includes a second wall that connects to the first edge and a third wall that connects to the second edge, and wherein an outer surface of the first wall is convex.

5. The suspension linkage of claim 1 wherein the extruded body is comprised of aluminum or a magnesium alloy.

6. The suspension linkage of claim 1 wherein the first wall defines an upper surface of the extruded body when the suspension linkage is installed on a vehicle.

7. The suspension linkage of claim 6 wherein the upper surface is concave and external to the suspension linkage.

8. The suspension linkage of claim 1 wherein the first wall defines a lower surface of the extruded body when the suspension linkage is installed on a vehicle.

9. The suspension linkage of claim 8 wherein the lower surface is convex and internal to the suspension linkage.

10. The suspension linkage of claim 1 wherein the enclosed hollow cross-section is substantially rectangular.

11. The suspension linkage of claim 1 wherein the rib is oriented in an upward direction when the suspension linkage is installed on the vehicle.

12. The suspension linkage of claim 1 wherein the extruded body includes a first end portion disposed longitudinally opposite a second end portion, wherein the first end portion is directly connectable to the suspension unit and the second end portion is directly connectable to the frame of the motor vehicle.

13. A suspension linkage for connecting a suspension unit to a frame of a motor vehicle, the suspension linkage comprising:
   an extruded body having a longitudinal length and having a fixed cross-sectional profile along a portion of the longitudinal length that is created by pushing a material through a die that defines the fixed cross-section, the extruded body having a first wall having a first thickness, a second wall, and a third wall; and
   an extruded rib disposed on the first wall of the extruded body, the rib having a proximal end connected to the first wall and an opposite unconnected distal end spaced away from the first wall, wherein the extruded rib has a cross-sectional profile for tuning a flexural rigidity of the suspension linkage, a thickness of the extruded rib is greater than the first thickness, and a width of the extruded rib is less than half of a width of the first wall;
   wherein the rib is located on an outer surface of the first wall of the extruded body and the rib projects from the outer surface, wherein a second wall connects to the first wall at a first corner and a third wall connects to the first wall at a second corner, wherein the rib has a first side and a second side defining a width of the rib and the first and second sides are spaced inward from the first and second corners.

14. The suspension linkage of claim 13 wherein the extruded body includes a first end portion disposed longitudinally opposite a second end portion, wherein the first end portion is directly connectable to the suspension unit and the second end portion is directly connectable to the frame of the motor vehicle.

15. The suspension linkage of claim 14 wherein the extruded rib extends along the entire longitudinal length of the first wall from the first end portion to the second end portion.

16. The suspension linkage of claim 13 wherein the rib is oriented in an upward direction when the suspension linkage is installed on the vehicle.

* * * * *